(12) United States Patent
Badeke et al.

(10) Patent No.: US 9,481,597 B2
(45) Date of Patent: *Nov. 1, 2016

(54) METHOD FOR PRODUCING SYNTHETIC QUARTZ GLASS

(71) Applicant: Heraeus Quarzglas GmbH & Co. KG, Hanau (DE)

(72) Inventors: Klaus-Uwe Badeke, Götschetal (DE); Norbert Otto, Teutschenthal (DE); Martin Trommer, Bitterfeld (DE); Hilmar Laudahn, Bitterfeld-Wolfen (DE); Andreas Brueckel, Bitterfeld-Wolfen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 27 days.

This patent is subject to a terminal disclaimer.

(21) Appl. No.: 14/365,944

(22) PCT Filed: Dec. 13, 2012

(86) PCT No.: PCT/EP2012/075346
§ 371 (c)(1),
(2) Date: Jun. 16, 2014

(87) PCT Pub. No.: WO2013/087751
PCT Pub. Date: Jun. 20, 2013

(65) Prior Publication Data
US 2015/0007611 A1    Jan. 8, 2015

(30) Foreign Application Priority Data

Dec. 16, 2011  (DE) .................. 10 2011 121 190

(51) Int. Cl.
*C03B 19/14*          (2006.01)

(52) U.S. Cl.
CPC ....... *C03B 19/1415* (2013.01); *C03B 2201/02* (2013.01); *C03B 2207/32* (2013.01); *C03B 2207/85* (2013.01); *Y02P 40/57* (2015.11)

(58) Field of Classification Search
CPC .......... C03B 19/1415; C03B 2207/32; C03B 2207/85; C03B 2201/02
See application file for complete search history.

(56) References Cited

U.S. PATENT DOCUMENTS 5,043,002 A * 8/1991 Dobbins ............. C03B 19/1415
                                                      423/336
5,152,819 A * 10/1992 Blackwell ........... C03B 19/1415
                                                      423/336

(Continued)

FOREIGN PATENT DOCUMENTS

EP        0463045 B1    8/1996
JP      2000017438 A    1/2000

OTHER PUBLICATIONS

Espacenet English language abstract of JP 2000 017438 A, published Jan. 18, 2000.

*Primary Examiner* — Jason L Lazorcik
(74) *Attorney, Agent, or Firm* — Tiajoloff & Kelly LLP

(57) ABSTRACT

The invention relates to a method for producing synthetic quartz glass by vaporizing a polyalkylsiloxane as a liquid $SiO_2$ feedstock (105), converting the vaporized $SiO_2$ feedstock (107) into $SiO_2$ particles, separating the $SiO_2$ particles, forming a soot body (200) and vitrifying the soot body (200). According to the invention, the vaporizing of the heated $SiO_2$ feedstock (105) comprises an injection phase in an expansion chamber (125), in which the $SiO_2$ feedstock (105) is atomized into fine droplets, wherein the droplets have an average diameter of less than 5 pm, and wherein the atomizing of the droplets takes place in a preheated carrier gas stream which has a temperature of more than 180° C.

2 Claims, 3 Drawing Sheets

(56) References Cited

U.S. PATENT DOCUMENTS

Figure 1:
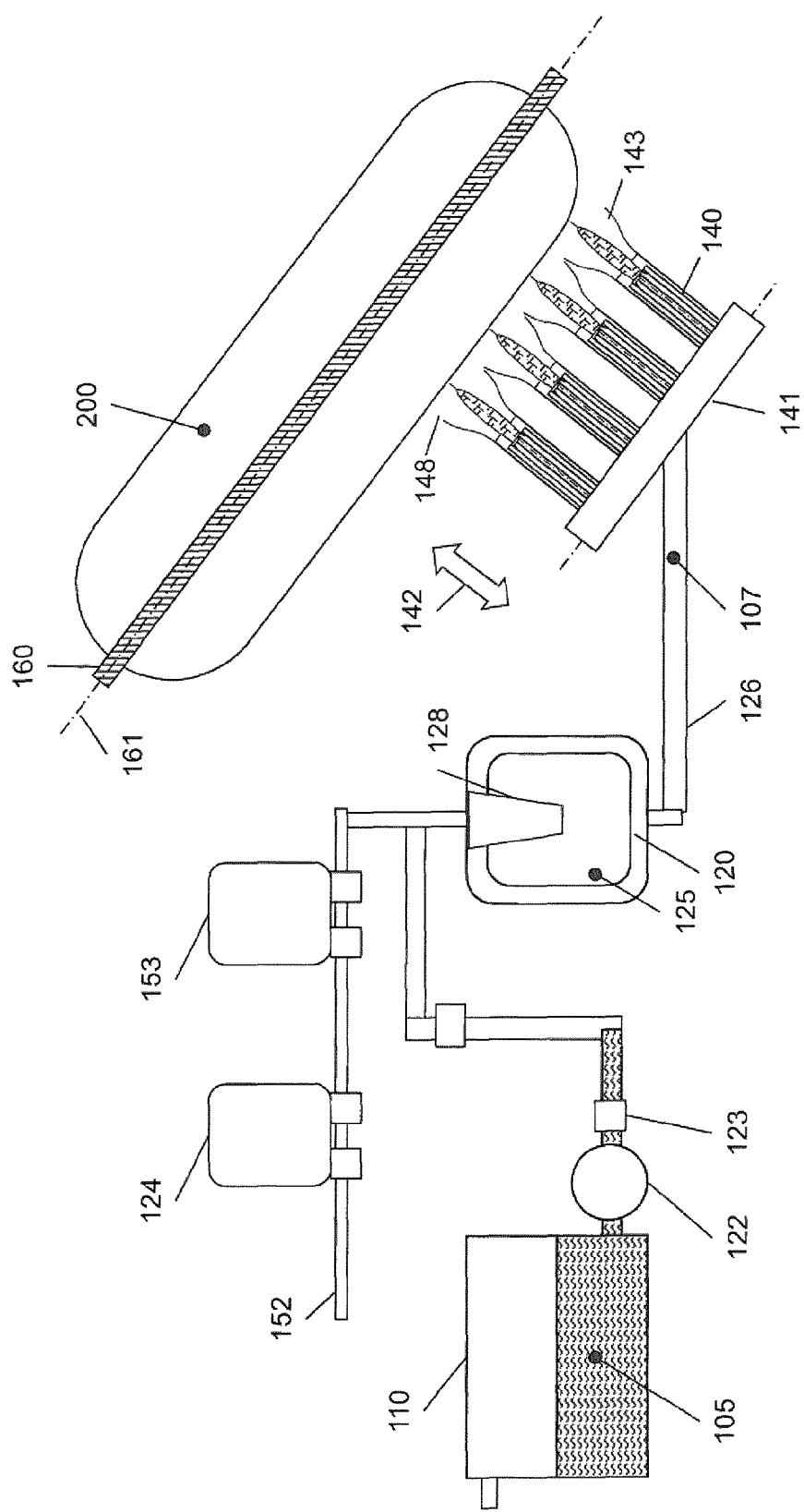

| | | | |
|---|---|---|---|
| 5,558,687 A * | 9/1996 | Cain | B01D 3/346 159/4.01 |
| 5,707,415 A | 1/1998 | Cain | |
| 5,938,853 A * | 8/1999 | Williams | B01D 1/22 118/726 |
| 6,244,575 B1 * | 6/2001 | Vaartstra | C23C 16/4486 118/708 |
| 6,260,385 B1 * | 7/2001 | Sempolinski | C03B 19/106 65/17.4 |
| 6,312,656 B1 * | 11/2001 | Blackwell | B01J 19/26 423/337 |
| 6,546,757 B1 * | 4/2003 | Morse | C03B 19/1415 65/377 |
| 6,672,106 B1 * | 1/2004 | Hawtof | C03B 19/1423 65/17.2 |
| 6,705,127 B1 * | 3/2004 | Cain | C03B 37/01413 423/336 |
| 6,766,702 B2 * | 7/2004 | Heintzenberg | G01N 15/0205 702/29 |
| 2002/0024161 A1 * | 2/2002 | Konya | C03B 19/1025 264/15 |
| 2003/0116091 A1 * | 6/2003 | Grant | C23C 16/4486 118/726 |
| 2003/0167796 A1 * | 9/2003 | Hawtof | C03B 19/1423 65/17.4 |
| 2006/0107693 A1 * | 5/2006 | Trommer | C03B 19/1415 65/17.4 |
| 2013/0045854 A1 * | 2/2013 | Coapes | C03B 19/1415 501/53 |
| 2013/0133375 A1 * | 5/2013 | Fabian | C03B 37/018 65/377 |
| 2013/0133376 A1 * | 5/2013 | Fabian | C03B 20/00 65/395 |
| 2013/0133377 A1 * | 5/2013 | Fabian | C03B 20/00 65/414 |
| 2013/0133378 A1 * | 5/2013 | Fabian | C03B 37/01807 65/421 |
| 2014/0349830 A1 * | 11/2014 | Trommer | C03B 37/01406 501/32 |

\* cited by examiner

METHOD FOR PRODUCING SYNTHETIC QUARTZ GLASS

PRIOR ART

The present invention relates to a method for producing synthetic quartz glass.

Chlorine-free feedstocks are tested for the production of synthetic quartz glass for commercial applications. Monosilanes, alkoxysilanes and siloxanes should be mentioned as examples. A particularly interesting group of chlorine-free feedstocks are the polyalkylsiloxanes (shortly also called "siloxanes"), which are e.g. known from EP 463 045 A1. The substance group of the siloxanes can be subdivided into open chain polyalkylsiloxanes and into closed chain polyalkylsiloxanes. The polyalkylsiloxanes have the general total formula $SiO_p(R)_{2P}$, where P is an integer $\geq 2$. The residue "R" is an alkyl group; in the simplest case a methyl group.

Polyalkylsiloxanes are distinguished by a particularly high amount of silicon per weight fraction, which makes their use in the production of synthetic quartz glass profitable. Octamethylcyclotetrasiloxane (OMCTS) is preferably used because of its large-scale availability in a high purity. This substance is also called "D4" according to a notation introduced by General Electric Inc., wherein "D" represents the group $[(CH_3)_2Si]$-0-.

The silicon-containing feedstock can be supplied to the consumer, e.g. a deposition burner, in liquid form. As a rule, however, the liquid feedstock is converted by means of a vaporizer into a gaseous or vaporous phase and a continuous gas stream is supplied to the consumer. In the known vaporization systems, the liquid to be vaporized is brought into contact with a hot surface. Especially in the case of organic feedstock, hot surfaces may lead to unforeseeable changes, for instance decompositions or polymerizations.

TECHNICAL OBJECTIVE

The decomposition products or polymerizates, respectively, cause depositions in piping systems and lead in the end to hardly controllable and non-reproducible process conditions. This yields a certain variability and non-reproducibility in the process control, which may lead to defects in the particle formation process and to inhomogeneities in the soot build-up.

It is the object of the present invention to provide a method for producing $SiO_2$ soot bodies with a high material homogeneity, in which the said drawbacks are avoided.

GENERAL DESCRIPTION OF THE INVENTION

To achieve this object, a method is suggested comprising the features of patent claim 1. The method according to the invention for producing synthetic quartz glass comprises the following method steps:
(A) providing a liquid $SiO_2$ feedstock having more than 70% by wt. of the polyalkylsiloxane D4,
(B) vaporizing the liquid $SiO_2$ feedstock into a gaseous $SiO_2$ feedstock vapor,
(C) converting the $SiO_2$ feedstock vapor into $SiO_2$ particles,
(D) depositing the $SiO_2$ particles on a deposition surface so as to form a $SiO_2$ soot body,
(E) vitrifying the $SiO_2$ soot body so as to form the synthetic quartz glass.

According to the invention it is intended that the vaporization of the heated $SiO_2$ feedstock comprises an injection phase in an expansion chamber in which the $SiO_2$ feedstock is atomized into fine droplets, wherein the droplets have a mean diameter of less than 5 μm, preferably less than 2 μm, and the atomization of the droplets takes place in a preheated carrier gas stream which has a temperature of more than 180° C.

Within the scope of the method according to the invention a liquid $SiO_2$ feedstock is to be converted into a $SiO_2$ feedstock vapor. The $SiO_2$ feedstock vapor predominantly comprises polyalkylsiloxanes; the $SiO_2$ feedstock vapor preferably consists of polyalkylcyclosiloxanes, particularly preferably the $SiO_2$ feedstock vapor comprises D4 as the main component. To obtain homogeneous soot bodies, polymerization of the polyalkylsiloxanes must be prevented during vaporization. This can be accomplished with the method according to the invention.

Shown is a vaporization method which particularly for the continuous vaporization of polyalkylsiloxanes, particularly OMCTS (=D4) over periods of >10 h in batch operation at high vaporization rates of >20 kg/h permits an almost residue-free vaporization in the vaporizer without the formation of objectionable polymeric by-products. The crucial point is that the liquid or liquid droplets to be vaporized are not heated above their vaporization temperature during vaporization. To this end an atomization of the liquid into very small liquid droplets with a large surface is to be accomplished on the one hand so as to generate a surface that is as large as possible for the heat transfer. On the other hand, a very short residence time of the $SiO_2$ feedstock in the vaporization reactor (also called vaporizer) is to be achieved so as to have a reaction time of the siloxane in the vaporizer that is as short as possible. At a very short mean residence time in the vaporization reactor (<2 seconds), the carrier gas temperature and the surface temperature in the vaporization reactor can also be—under these conditions—above the boiling point of the liquid to be vaporized because the liquid droplets are simultaneously subjected to cooling during the phase conversion (liquid—vaporous).

It is the essential idea that the liquid to be vaporized is converted (=designated as nebulized or atomized) into very fine droplets and is mixed so to speak "in situ" during atomization with a strongly preheated carrier gas stream (with a temperature of more than 180° C., particularly more than 230° C.) in the molar ratio carrier gas/siloxane >=1.5 (preferably in the molar ratio of more than 2.5, particularly more than 3). The finest liquid drops (<10 microns) absorb the heat from the preheated carrier gas through the outer surface and a first layer of the outer surface of the droplet vaporizes and forms a thin vapor film around the droplet. The liquid droplets which are surrounded by a vapor film are directly transported into a vaporization reactor and there completely vaporized. Since the liquid droplets are surrounded by a thin vapor film with high vapor concentration, the liquid phase of the liquid droplets (=inner portion of the droplet that has not been vaporized yet) can at no time get into direct contact with the inner wall of the vaporizer of the heat exchanger. This prevents the liquid phase of the liquid drop from getting into direct contact with the metal surface of the vaporization reactor.

In an advantageous configuration, the method according to the invention is utilized in a vaporizer. Said vaporizer, also called vaporization chamber, comprises two zones. The first zone is the atomization zone in which the liquid $SiO_2$ feedstock is converted into fine droplets. This process, which is also called atomization, comprises an atomization of the liquid into drops having a diameter of less than 2 μm (1 μm=1 micron), preferably of less than 0.5 μm. Furthermore, the drops are mixed with a carrier gas in this first zone.

The special feature of the method according to the invention consists in that the carrier gas is preheated. It is known in the prior art that a carrier gas is used that has room temperature (about 10° C. to about 40° C.). By contrast, the method according to the invention uses a strongly heated carrier gas with a temperature of more than 180° C., preferably more than 230° C., to support atomization. Hence, the carrier gas serves on the one hand as a carrier of the drops as such. At the same time the carrier gas reduces the dew point of the $SiO_2$ feedstock used, thereby ensuring a faster transition from the liquid phase into the gas phase. Furthermore, the strongly heated carrier gas serves to ensure a first energy input into the liquid $SiO_2$ feedstock within a short time interval. The use of very strongly heated carrier gas as compared with the use of cold carrier gas known in the prior art offers multiple advantages. On the one hand, the liquid $SiO_2$ feedstock need not be preheated. The feedstock can be taken from a supply container directly and in a cold state, i.e. in an unheated state. It is thereby possible to use liquid flow meters so as to determine the amount of the $SiO_2$ feedstock added to the vaporizer. Such types of liquid flow meters operate at temperatures of not more than 80° C. Owing to the use of liquid $SiO_2$ feedstock which at the most has a temperature of not more than 60° C., preferably less than 50° C., particularly preferably less than 40° C., the liquid amounts supplied to the vaporizer can be precisely determined with the liquid flow meter. This is advantageous for reproducible process conditions. The gels created thereby may lead to clogging or cross-sectional restrictions in the feed lines, etc. at such high throughputs as are to be accomplished with the method as disclosed herein. This, in turn, has an influence on the pressure and flow conditions in the vapor line. Since in the method as disclosed herein the $SiO_2$ feedstock, particularly the polyalkylsiloxanes, are heated in the feed line in the liquid state to preferably less than 40° C., particularly preferably are kept at room temperature, polymerization will no longer take place. Hence, there will be no clogging in the feed lines and/or on the liquid flow meter.

Since in the first zone of the vaporizer the $SiO_2$ feedstock has been atomized and mixed with the hot carrier gas, said mixture flows into the second zone of the vaporizer. The second zone, also called heat exchanger zone and/or heat exchanger, serves the further energy supply and thus further vaporization. Due to the use of a hot carrier gas the energy supply needed in the second zone is less than in the prior art. Moreover, the vapor protection layer formed around the droplet during the sudden vaporization in the atomizer, also called atomizator, serves as a kind of shield against a direct contact of the liquid in the droplet with the wall and/or inner channels of the second zone. This prevents a polymerization of the liquid $SiO_2$ feedstock in the droplets.

The vapor protection layer encases the liquid $SiO_2$ feedstock in the droplet. It acts as a shield for the liquid against external influences. Advantageously, it has been found that energy inputs through this vapor layer can very quickly penetrate into the liquid $SiO_2$ feedstock. Hence, the vapor protection layer supports the vaporization of the liquid $SiO_2$ feedstock in the droplet. This finding explains why when the droplet is approaching a heated wall in the second zone there is no direct contact between the liquid $SiO_2$ material and the second zone. Rather, the heat radiated in the second zone is absorbed by the vapor protection layer and is concentrated on the liquid $SiO_2$ feedstock such that rapid vaporization takes place. Hence, there is no direct contact between the liquid $SiO_2$ feedstock and walls or channels of the second zone. This considerably reduces the tendency of the polyalkylsiloxanes to polymerization. Hence, on the whole, the inner surface of the vaporizer and also all discharging channels out of the vaporizer are much less acted upon with polymerized residues of the polyalkylsiloxanes than in the prior art.

To diminish the chances of a direct contact of the liquid $SiO_2$ feedstock with inner walls or channels of the heat exchanger, i.e. of the second zone, it has turned out to be advantageous when the time interval from the feeding of the liquid $SiO_2$ feedstock into the atomizer up to the exit of the gaseous $SiO_2$ feedstock vapor is kept as short as possible. Advantageously, the mean residence time is less than one second.

Hence, the surface temperature of the vaporization reactor in the second zone can be at least 10° C. above the dew point of the gas mixture. Owing to the protective vapor film around the droplet a direct wall contact of the liquid phase and thus also an overheating of the liquid phase is avoided. Hence, the risk of a partial polymerization of the siloxane in the second zone of the vaporizer is avoided.

Furthermore, the mean residence time of the vapor molecules in the vaporizer volume of the vaporizer can be less than 2 seconds, preferably less than 1 second, even more preferably less than 0.5 second.

An advantageous configuration of the method is distinguished in that the vaporizer comprises a first zone and a second zone. The first zone comprises the atomization unit and the second zone the heat exchanger.

An advantageous configuration of the method is distinguished in that fine droplets are generated (e.g. nozzle, ultrasonic atomization) in the atomization unit from the liquid $SiO_2$ feedstock with a mean droplet size of less than 10 microns, preferably less than 5 microns, particularly preferably less than 2 microns.

An advantageous configuration of the method is distinguished in that the atomization of the droplets takes place in a preheated carrier gas stream. This carrier gas particularly comprises nitrogen or argon or helium and has a temperature of more than 180° C., preferably a temperature of more than 200° C., particularly preferably a temperature of more than 230° C. to not more than 350° C.

An advantageous configuration of the method is distinguished in that the energy input of the carrier gas around the atomized droplets initiates a partial droplet vaporization over the surface of the droplet, and a vapor film is thereby formed around the surface of the droplet.

An advantageous configuration of the method is distinguished in that due to the vapor film the liquid phase of the droplet surrounded by the vapor film is not subjected to a direct contact with heated elements in the second zone and/or the heat exchanger unit, so that a wetting of liquid drops on the walls within the vaporizer is excluded.

An advantageous configuration of the method is distinguished in that at least 7.5% of the energy input by the carrier gas contributes to the vaporization of the siloxane.

An advantageous configuration of the method is distinguished in that the surface temperature of the heat exchanger is above the boiling point of the siloxane to be vaporized.

An advantageous configuration of the method is distinguished in that the mean residence time of the siloxane in the vaporizer is <5 seconds, preferably <1 second.

An advantageous configuration of the method is distinguished in that the ratio of generated vapor volume per second (OMCTS+carrier gas at the vapor exit temperature) and inner volume of the vaporization chamber is >0.5, preferably >1.

The vaporizer can be oriented both in a vertical and in a horizontal direction. It is the principle of the vaporizer to achieve a direct under-saturation of the vapor pressure of the liquid (exceeding of the dew point) owing to the very small droplet size in combination with a high heat transfer, high flow velocities and short residence times. As a result, objectionable condensate droplets are no longer formed. A preferred orientation of the vaporizer is therefore not required.

EMBODIMENT

Figure 2:
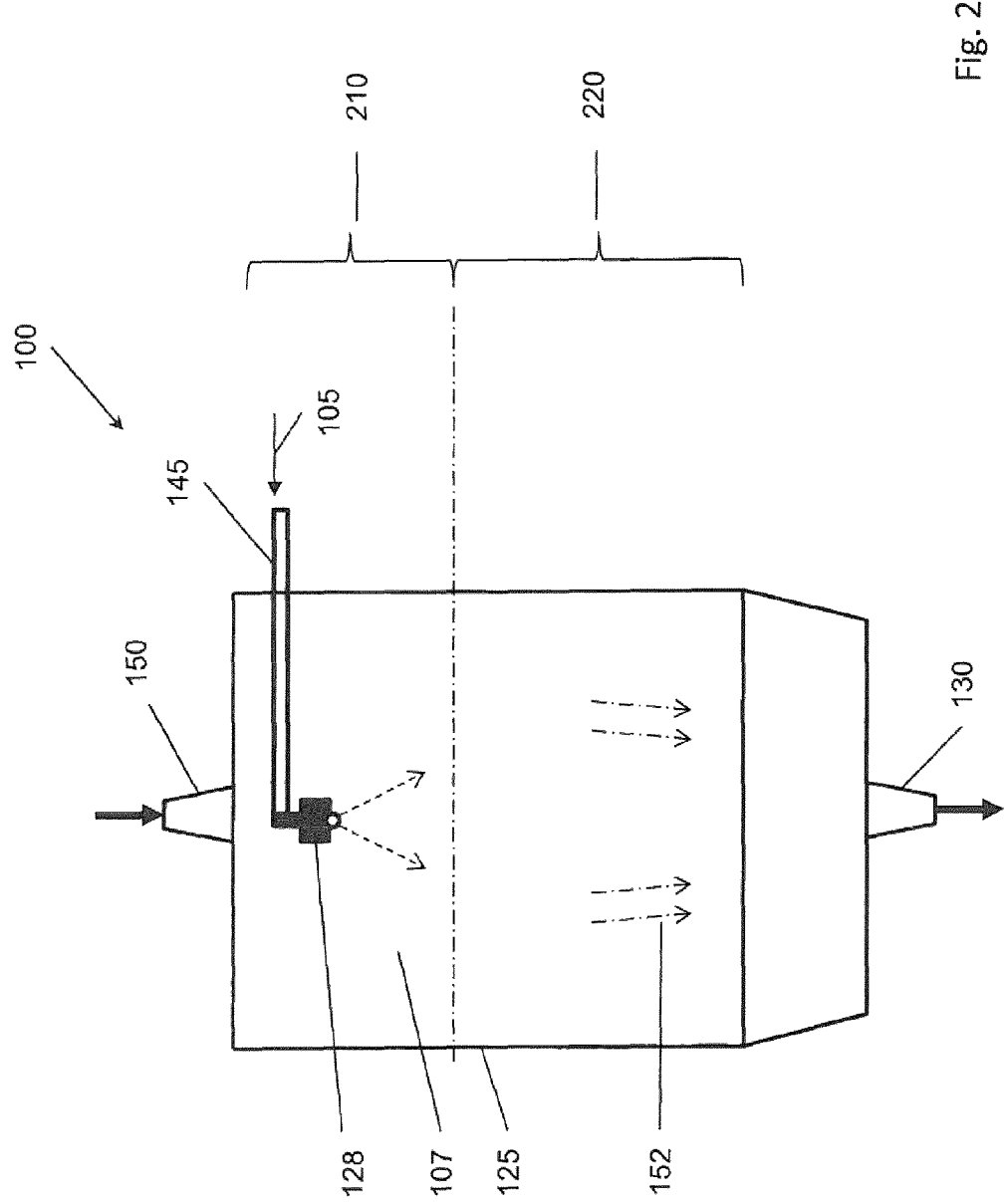
Figure 3:
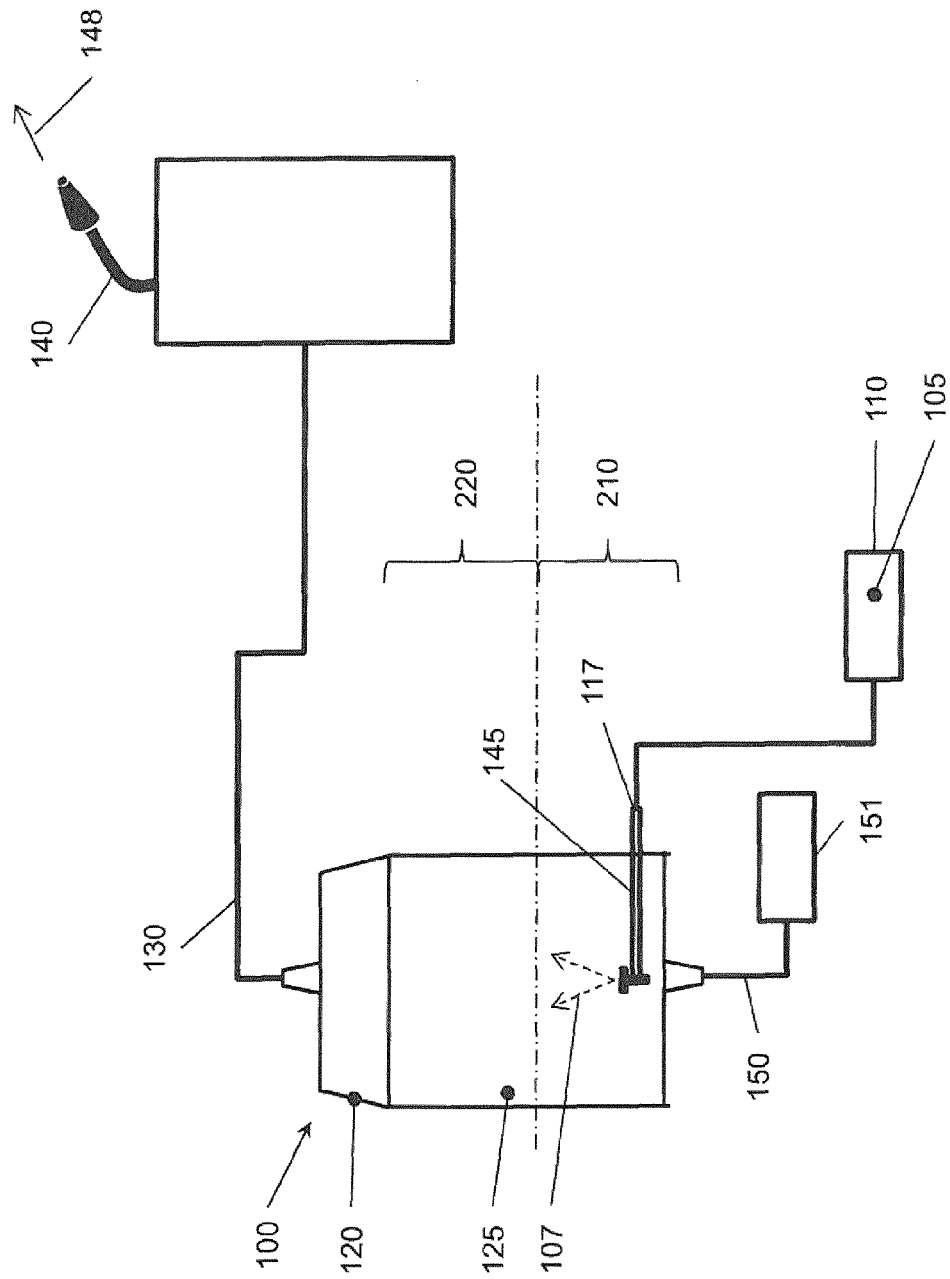

Further advantages, features and details of the invention become apparent from the following description, in which an embodiment of the invention is described in detail with reference to the drawings. The features mentioned in the claims and the description can here be essential for the invention, each as such or in any combination. Shown is in FIG. 1 an apparatus for performing the method according to the invention for producing a SiO$_2$ soot body, in a schematic representation;

FIG. 2 a schematic diagram of the various elements of the quartz glass production system according to the invention; and FIG. 3 a further schematic representation of a vaporization chamber.

The starting point of the method according to the invention is here the formation of a gas stream from a SiO$_2$ feedstock vapor 107 which contains D4 as the main component. The gas stream is supplied to a reaction zone in which the SiO$_2$ feedstock vapor is converted by pyrolysis, oxidation or hydrolysis into SiO$_2$ while forming amorphous SiO$_2$ particles. The subsequent deposition of the amorphous SiO$_2$ particles on a deposition surface 160 yields a porous SiO$_2$ soot body 200, which forms a synthetic quartz glass by vitrification. To permit the production of large-volume cylindrical soot bodies 200 with outer diameters of more than 300 mm with improved material homogeneity, the invention discloses that the vaporization of the heated SiO$_2$ feedstock comprises an injection phase in an expansion chamber in which the SiO$_2$ feedstock, specifically in liquid form, is atomized into fine droplets, the droplets having a mean diameter of less than 5 µm, preferably less than 2 µm.

The apparatus shown in FIG. 1 serves to produce a SiO$_2$ soot body 200. A plurality of serially arranged flame hydrolysis burners 140 are arranged along a carrier tube 160 of aluminum oxide. In a method modification aiming at an increased productivity, a plurality of deposition burners are used instead of only one burner 140, said plurality of deposition burners being reversingly reciprocated for soot deposition in a joint burner row along the rotating carrier, each of the burner flames sweeping over only a sub-length of the carrier tube 160.

The SiO$_2$ feedstock 105 preferably comprises more than 95% by wt., preferably more than 98% by wt., particularly more than 99.5% by wt. of the polyalkylsiloxane D4, and is supplied in gaseous form to the reaction zone and thereby decomposed by oxidation and/or hydrolysis and/or pyrolysis into SiO$_2$. The reaction zone is e.g. a burner flame or plasma. SiO$_2$ particles 148 are formed in the reaction zone, and these are deposited layer by layer on the deposition surface 160 while forming the SiO$_2$ soot body 200. The SiO$_2$ particles 148 themselves are present in the form of agglomerates or aggregates of SiO$_2$ primary particles with particle sizes in the nanometer range.

The flame hydrolysis burners 140 are mounted on a joint burner block 141 which is reciprocated in parallel with the longitudinal axis 161 of the carrier tube 160 between two turning points that are stationary relative to the longitudinal axis 161, and which is vertically displaceable thereto, as outlined by the directional arrows 142. The burners 140 consist of quartz glass; their center-to-center distance is 15 cm.

The flame hydrolysis burners 140 have each assigned thereto a burner flame 143 which represents a reaction zone within the meaning of the invention. In this zone SiO$_2$ particles are formed and deposited on the outer cylindrical surface of the carrier tube 160 rotating about its longitudinal axis 161, so that a soot body 200 with an outer diameter of 350 mm is built up layer by layer. During the deposition process a temperature of about 1200° C. is achieved on the soot body surface 200. Oxygen and hydrogen are respectively supplied as burner gases to the flame hydrolysis burners 140, and the SiO$_2$ feedstock vapor 107 as feedstock for the formation of the SiO$_2$ particles. Within the scope of this invention the term polyalkylsiloxanes encompasses both polyalkylcyclosiloxanes and their linear homologs.

The generation of the SiO$_2$ feedstock vapor from more than 95% by wt., preferably more than 98% by wt., particularly more than 99.5% by wt. of the polyalkylsiloxane D4 is carried out by means of a vaporizer system 120 which comprises a supply container 110 for the liquid mixture, a pulsation-free liquid pump 122, a flow meter 123 for liquid, a MFC (mass flow controller) 124 for the controlled supply of a nitrogen carrier gas stream 152 and a heatable vaporization chamber 125, also expansion chamber, with an atomizer nozzle 128. The supply container 110, a pump 122 and an atomizer nozzle 110 are interconnected by means of metallic lines. The supply container 110 is heated to a temperature of 30-40° C., also kept at room temperature, and the liquid is supplied by means of the pump 122 via the flow meter 123 in an exact dosage to the atomizer nozzle 128. In and by means of the atomizer nozzle, the SiO$_2$ feedstock 105 is atomized into fine droplets, also called SiO$_2$ droplets, wherein the SiO$_2$ droplets have a mean diameter of less than 5 µm, preferably less than 2 µm. A concentration detector may here be provided in the connection line between flow meter 123 and atomizer 128 for monitoring the composition of the SiO$_2$ feedstock 105 and/or the SiO$_2$ feedstock vapor 107 and/or the SiO$_2$ droplets.

The atomizer 128, also called atomizer nozzle, may be an ultrasonic atomizer or a supersonic atomizer. This atomizer nozzle 128 ensures that the liquid SiO$_2$ feedstock is atomized into fine droplets, the droplets having a mean diameter of less than 5 µm, preferably less than 2 µm. Depending on the design, a nitrogen carrier gas stream can be supplied to the SiO$_2$ feedstock 105 and/or the droplets via the MFC 123 at a pressure of 1.5 bar to 5 bar.

In an advantageous embodiment, the atomizer nozzle 128 together with a separately supplied carrier gas, which is preheated to more than 200° C., atomizes the SiO$_2$ feedstock 105 into fine droplets with a maximum diameter of 5 µm and small droplet size distribution with a mean diameter ($d_{50}$ value) of 0.9 µm, and directly thereafter sprays said droplets in the injection phase into the downstream heat exchanger zone 220 of the vaporizer 120. The vaporizer 120 has an internal temperature of up to 300° C., so that the fine liquid droplets directly vaporize and the vapor stream is supplied to a flow divider and is distributed by the divider via heat-insulated flexible media supply lines over the individual deposition burners 140. The carrier gas is heated up in a preheater 153. The carrier gas is here heated to temperatures beyond 200° C.

A supply line for the combustion gases oxygen and hydrogen and of an auxiliary gas (oxygen), which is used in the burner flame 143 between the stream of the feedstock and the stream of the combustion gas and which counteracts premature mixing, also terminate in the flow divider. Hence, combustion gases and the $SiO_2$ feedstock vapor 107 are mixed only in the hot zone of the burner flame 143. After completion of the deposition process one obtains a tube of porous $SiO_2$ soot (soot tube).

FIGS. 2 and 3 show the system 100 for producing quartz glass which utilizes the method according to the invention. The $SiO_2$ feedstock 105 is here atomized by means of an atomizer nozzle 128 (e.g. supersonic atomization). To this end the system 100 comprises a supply tank 110 from which the liquid $SiO_2$ feedstock 105 is pumped by means of a pump 122 into the atomizer nozzle. The transition from the liquid $SiO_2$ droplets into the gaseous $SiO_2$ feedstock vapor 107 takes place in an expansion chamber 125. By definition, the expansion chamber 125 comprises a first zone 210 and a second zone 220. Hence, the expansion chamber 125 comprises the whole inner volume of the vaporizer, i.e. the atomization zone and the heat exchanger zone. In the first zone 210 of the expansion chamber 125, the atomization of the liquid and the simultaneous mixing with the strongly preheated carrier gas take place, as well as the transportation of the droplets into the second zone 220 of the expansion chamber 125. The $SiO_2$ feedstock vapor 107 flows via a line 130 to the burner 140 where a pyrolytic and/or hydrolytic conversion of the $SiO_2$ feedstock vapor into $SiO_2$ particles takes place.

Within the supply container 110 the $SiO_2$ feedstock 105 is heated to temperatures clearly below the boiling point, preferably to room temperature, of the $SiO_2$ feedstock. This can be done by using a hot oil system or an electric heating element in the walls of the preheater. To achieve a uniform heating of the liquid $SiO_2$ feedstock 105 while avoiding hot regions, it has turned out to be advantageous when the supply container 110 comprises a flow channel which is surrounded by hot oil channels. The liquid-to-liquid heat transfer that can thereby be implemented achieves a uniform heating of the liquid $SiO_2$ feedstock 105. This type of uniform heating ensures that there is no chemical reaction of the polyalkylsiloxanes caused by the temperatures. The heated liquid $SiO_2$ feedstock 105 is discharged from the supply container 110 into the expansion chamber 125 through a feed line 145.

The expansion chamber 125, also called vaporizer chamber, defines an internal volume for the free expansion of the $SiO_2$ feedstock vapor. To achieve a uniform vaporization of the $SiO_2$ droplets into the gaseous feedstock vapor, it has not turned out to be advantageous when the temperature of the liquid $SiO_2$ feedstock is raised in the supply container 110 beyond the boiling point of the $SiO_2$ feedstock at the operating pressure of the expansion chamber. A preferred operating temperature for the supply container 110 is below 40° C., ideally at room temperature (=22° C.). The boiling point of D4 at atmospheric pressure is about 175° C. Hence, it is avoided that gels or deposits are formed by polymerization of the $SiO_2$ feedstock.

As shown in FIG. 3, the liquid $SiO_2$ feedstock flows from the supply container 110 through the feed line 145 into the interior of the expansion chamber 125 without the $SiO_2$ feedstock 105 being heated to temperatures of more than 40° C. The $SiO_2$ feedstock is then atomized by means of the atomizer nozzle 128. An additional heat input is achieved through a carrier gas which is e.g. also passed through the atomizer nozzle 128.

Nitrogen, in particular, has turned out to be advantageous as the carrier gas 152, also called diluent. Other diluents, such as argon or helium, can also be used if this is desired. These are gases that show an inert behavior with respect to polyalkylsiloxanes, so that oxidation, polymerization or decomposition reactions are avoided between the liquid and the carrier gas, especially under pressure and at an elevated temperature, and thus a non-reproducible change in the composition of the feedstock. By adding the diluent the particle pressure of the liquid $SiO_2$ feedstock, here the droplets of the $SiO_2$ feedstock, is reduced in the expansion chamber 125 and the dew point thereof is thus lowered. It is the aim that the vaporization of the $SiO_2$ feedstock comprises an injection phase in which the feedstock in the first zone in liquid form is atomized into fine droplets and the fine droplets after contact with a hot carrier gas in the second zone are rapidly and efficiently vaporized completely without contact of the liquid core of the droplet with walls of the expansion chamber 125.

FIG. 3 illustrates the vaporization according to the invention. The heated $SiO_2$ feedstock 105 is supplied through the feed line 145 to the expansion chamber 125. At the end of the feed line 145 in the interior of the expansion chamber 125 the feed line 145 comprises a nozzle-like atomizer nozzle 128. With the help of the atomizer nozzle 128, which is preferably an ultrasonic atomizer, the liquid $SiO_2$ feedstock 105 is atomized into fine droplets which have a mean diameter of less than 5 µm, preferably less than 2 µm, particularly less than one µm. Particularly preferred results are obtained when the mean particle size is less than 0.5 µm ($d_{50}$ value). The median value or $d_{50}$ value is here—as a measure of the mean particle size—the most important parameter. The $d_{50}$ value stands for the value at which 50 percent of the droplets are finer and the other 50% are coarser than $d_{50}$.

Owing to the pressure drop that occurs upon exit out of the atomizer nozzle 128, an essential part of the droplets passes into the gas phase. In addition, nitrogen which is preheated to about 180° C. up to about 300° C. is passed through the media line 150 into the expansion chamber 125 and the atomizer nozzle 128.

It is not intended that parts of the liquid $SiO_2$ feedstock 105—the droplets—deposit on the walls of the expansion chamber 125 and/or are thermally vaporized there. The gaseous $SiO_2$ feedstock vapor 107 flows out through the line 130 to the burner 140. In the burner 140, the $SiO_2$ feedstock vapor 107 is converted by pyrolysis, oxidation or hydrolysis into $SiO_2$ particles 148—also as $SiO_2$ or soot or $SiO_2$ soot.

LIST OF REFERENCE NUMERALS

100 system
105 $SiO_2$ feedstock
107 $SiO_2$ feedstock vapor
110 supply tank/supply container
117 outlet
120 vaporizer/vaporizer system
122 liquid pump
123 flow meter
124 MFC (mass flow controller)
125 expansion chamber/vaporization chamber
126 line
127 flow divider
128 atomizer nozzle
130 line
140 burner/flame hydrolysis burner
141 burner block 142 movement of 140
143 burner flame
145 feed line
148 SiO$_2$ soot
150 media line
151 supply container
152 diluent
153 preheater
160 deposition surface/carrier tube
161 longitudinal axis of 160
200 soot body

The invention claimed is:

1. A method for producing synthetic quartz glass, said method comprising:
   (A) providing a liquid SiO$_2$ feedstock having more than 70% by wt. of octamethylcyclotetrasiloxane,
   (B) vaporizing the liquid SiO$_2$ feedstock into a gaseous SiO$_2$ feedstock vapor,
   (C) converting the SiO$_2$ feedstock vapor into SiO$_2$ particles,
   (D) depositing the SiO$_2$ particles on a deposition surface so as to form a SiO$_2$ soot body,
   (E) vitrifying the SiO$_2$ soot body so as to form the synthetic quartz glass,
      wherein the vaporizing of the SiO$_2$ feedstock comprises injection of the liquid SiO$_2$ feedstock into an expansion chamber such that the SiO$_2$ feedstock is atomized into fine droplets, wherein the droplets have a mean diameter of less than 5 µm, and
      wherein the droplets are atomized in a preheated carrier gas stream that has a temperature of more than 180° C. and wherein a molar ratio of carrier gas to siloxane is greater than or equal to 1.5.

2. The method according to claim 1, wherein the droplets have a mean diameter of less than 2 µm and wherein the carrier gas stream is supplied at a pressure of 1.5 to 5 bar.

* * * * *